United States Patent
Bier et al.

(10) Patent No.: US 11,726,004 B2
(45) Date of Patent: Aug. 15, 2023

(54) TEST BENCH AND METHOD FOR CARRYING OUT A TEST RUN ON A TEST BENCH

(71) Applicant: AVL LIST GMBH, Graz (AT)

(72) Inventors: Maximilian Bier, Darmstadt (DE); Andreas Quick, Mannheim (DE)

(73) Assignee: AVL LIST GMBH, Graz (AT)

( * ) Notice: Subject to any disclaimer, the term of this patent is extended or adjusted under 35 U.S.C. 154(b) by 0 days.

(21) Appl. No.: 17/633,040

(22) PCT Filed: Aug. 3, 2020

(86) PCT No.: PCT/AT2020/060287
§ 371 (c)(1),
(2) Date: Feb. 4, 2022

(87) PCT Pub. No.: WO2021/022310
PCT Pub. Date: Feb. 11, 2021

(65) Prior Publication Data
US 2022/0291085 A1 Sep. 15, 2022

(30) Foreign Application Priority Data
Aug. 5, 2019 (AT) .............................. A50698/2019

(51) Int. Cl.
*G01M 15/04* (2006.01)
*G01M 13/026* (2019.01)
*G01L 3/22* (2006.01)
*G01M 15/02* (2006.01)

(52) U.S. Cl.
CPC ............. *G01M 13/026* (2013.01); *G01L 3/22* (2013.01); *G01M 15/042* (2013.01); *G01M 15/02* (2013.01)

(58) Field of Classification Search
CPC .. G01M 13/026; G01M 15/042; G01M 15/02; G01M 15/046; G01L 3/22
See application file for complete search history.

(56) References Cited

U.S. PATENT DOCUMENTS

| | | | |
|---|---|---|---|
| 9,400,231 B2 * | 7/2016 | Akiyama | G01L 3/242 |
| 9,453,781 B2 | 9/2016 | Kokal et al. | |
| 10,317,312 B2 * | 6/2019 | Pfister | G01M 13/02 |

(Continued)

FOREIGN PATENT DOCUMENTS

| | | |
|---|---|---|
| DE | 2828920 A1 | 1/1980 |
| DE | 102014204154 A1 | 9/2015 |

*Primary Examiner* — Freddie Kirkland, III
(74) *Attorney, Agent, or Firm* — Dykema Gossett PLLC

(57) ABSTRACT

Various aspects of the present disclosure are directed to a test bench and methods for carrying out a test run on a test bench. In one example embodiment, a test run method includes: connecting a test object to a load machine, specifying a target torque for a torque controller by a test bench automation unit according to the test run, adjusting an actual torque of the load machine by the torque controller, specifying a test object control variable for the test object by a test object controller, determining an actual rotational speed of the load machine, determining at least one deviation of at least one attribute of the actual rotational speed from at least one threshold value, and based on the at least one deviation, and determining at least one additive torque correction value and superimposing the at least one additive torque correction value on the target torque.

20 Claims, 2 Drawing Sheets

(56) References Cited

U.S. PATENT DOCUMENTS

| | | | |
|---|---|---|---|
| 10,962,445 B2* | 3/2021 | Pfeiffer | G01M 13/025 |
| 11,255,749 B2* | 2/2022 | Kokal | G06F 5/06 |
| 2016/0116367 A1 | 4/2016 | Pfister et al. | |
| 2019/0383703 A1 | 12/2019 | Kokal | |
| 2022/0326116 A1* | 10/2022 | Bier | G01M 13/025 |

* cited by examiner

TEST BENCH AND METHOD FOR CARRYING OUT A TEST RUN ON A TEST BENCH

CROSS-REFERENCE TO RELATED APPLICATIONS

This application is a national stage filing based upon International PCT Application No. PCT/AT2020/060287, filed 3 Aug. 2020, which claims the benefit of priority to Austria application No. A 50698/2019, filed 5 Aug. 2019.

BACKGROUND

The present invention relates to a method for carrying out a test run on a test bench, wherein a test object is connected to a load machine on the test bench, wherein a target torque is specified for a torque controller by a test bench automation unit according to the test run, whereby an actual torque of the load machine is adjusted by the torque controller, and a test object control variable is specified for the test object by a test object controller. The present invention also relates to a test bench for carrying out a test run, wherein a test object is connected to a load machine on the test bench to carry out the test run, wherein a test bench automation unit, a test object controller and a torque controller are provided, wherein the test object controller specifies a test object control variable for the test object and the test bench automation unit specifies a target torque for the torque controller according to the test run, whereby the torque controller adjusts an actual torque of the load machine.

In the development of internal combustion engines, of drive trains having internal combustion engines and of vehicles having internal combustion engines, testing the emission and consumption behavior of the internal combustion engine plays a central role. In all phases of development, the emission and consumption behavior of the internal combustion engine is tested on test benches, such as an engine test bench, a drive-train test bench or a chassis dynamometer. However, the legal framework for these tests is currently changing significantly. While previously mainly standardized driving cycles, such as the New European Driving Cycle (NEDC), were used for testing, testing under real driving conditions is now also required. For the emission behavior, Real Driving Emissions (RDE) test runs are used, in which no specific driving cycle is specified, but a more or less random driving route is covered, which only has to correspond to certain defined framework conditions.

It is therefore necessary to record measured values from real test drives using a vehicle on a real road, such as GPS data, engine speed, gas pedal position, vehicle speed, etc. Then, a test run that is representative of the test drive has to be created for a test bench from the recorded measured values, which test run then can be run through in whole or in part on the test bench, for example in order to record and evaluate the emission or consumption behavior of the internal combustion engine.

A test object, for example an internal combustion engine, is operated on the test bench according to the specifications of the test run, either alone (engine test bench) or in combination with other components (drive-train test bench, chassis dynamometer). To carry out the test run, the internal combustion engine is connected directly or indirectly to one or more load machines (dynamometers) on the test bench.

For example, the torque or the rotational speed can be used as a control variable or regulating variable for the load machine. A torque controller or a rotational speed controller can be used to adjust an actual torque or an actual rotational speed corresponding to a target torque or a target rotational speed. The load machine generates a load torque for the test object, for example via a connecting test bench shaft. The target torque or the target rotational speed is specified to the torque controller or the rotational speed controller by a test bench automation unit according to the specifications of the test run.

The actual torque or the actual rotational speed can be adjusted by the torque controller or rotational speed controller in the form of "regulation" in a control engineering sense, which means that the actual torque or the actual rotational speed is not fed back. Alternatively, the actual torque or the actual rotational speed can be fed back to the torque controller or rotational speed controller, which corresponds to "control" in a control engineering sense.

A test object controller is provided for the test object, which can basically also "regulate" or "control" the actual test object rotational speed or the actual test object torque as a regulating variable or control variable. For this purpose, a control variable can be specified for the test object, wherein a rotational speed or a torque is conceivable as the control variable, but also a control variable that affects the rotational speed or the torque, such as a gas pedal position, an injection quantity, an effective mean cylinder pressure, an ECU engine torque, an injection quantity, an injection timing, an ignition timing, etc. The control variable can also be specified for a test object, for example one that is designed to be passive, without setting a specific actual test object variable.

Thus, according to the specifications of the test run, a (discrete-time or continuous-time) time profile of the target torque, which in turn was generated from a real test drive, for example, is specified for the torque controller by the test bench automation unit. Likewise, a test object control variable is specified for the test object by the test object controller, whereby an actual test object torque or an actual test object rotational speed can be set as the actual test object variable. The load machine and the test object form an open mechanical loop. This means that an actual test object variable (for example, an actual test object torque) is not only mechanically routed from one test object interface to another test object interface, but that the actual test object variable is fully supported by one or more load machines. In order to carry out the test run, the test object is therefore loaded directly by one or more load machines via a test object interface. This direct loading ensures a rigid connection between the test object and the load machine and thus dynamic and precise loading of the test object. Furthermore, due to the direct loading, the test bench is easy to operate, wherein the test run is easy to follow.

Either a target torque is specified for a torque controller of the load machine or a target rotational speed is specified for a rotational speed controller of the load machine. If both a rotational speed controller and a torque controller are present, it is possible to switch between specifying a target torque and a target rotational speed, but the rotational speed controller and torque controller cannot be active at the same time. However, if such a switch between the rotational speed controller and the torque controller takes place, discontinuities can occur in the arrangement, which should be avoided. An example of a discontinuity is that the adjustment torque of the load machine can change abruptly, which means that the actual rotational speed and the actual torque also change abruptly and in an unintended manner.

DE 28 28 920 describes a test bench in which a torque controller is provided, which can be deactivated as a function of the rotational speed. This ensures that the control is switched off if the rotational speed reaches values that are too high.

It is an object of the present invention to specify a test bench for a test object that is directly loaded by one or more load machines, which test bench avoids the disadvantages described above and ensures a control method that is as robust as possible.

SUMMARY OF THE INVENTION

This object is achieved according to the invention by determining the actual rotational speed of the load machine and at least one deviation of at least one attribute of the actual rotational speed from at least one threshold value, and wherein at least one additive torque correction value is determined based on the at least one deviation and superimposed on the target torque.

The object is also achieved by providing a rotational speed determination unit for determining a rotational speed of the load machine on the test bench, wherein at least one comparison unit is provided, which is configured to determine at least one deviation of at least one attribute of the actual rotational speed from at least one threshold value, wherein at least one correction unit is provided, which is configured to determine, based on the at least one deviation, an additive torque correction value and superimpose it on the target torque.

For example, a drive (torque generator), a drive train component, a drive train, a vehicle, etc. can serve as a test object. Inputs and/or outputs of the test object can be connected to one or more load machines, wherein the connection can also be made via adapter gears.

For example, engine test benches, (differential) transmission test benches, power packs (engine and transmission), complete drive trains (up to the half shaft), chassis dynamometers, drive train elements (clutch, converter, center differential, differential, etc.) are conceivable as test benches.

According to the invention, it is assumed for the load machine that a torque controller is provided. Depending on the design, the torque controller can "regulate" the actual torque in the control engineering sense or "control" the actual torque in the control engineering sense.

In the present application, control and/or a regulation in the control engineering sense can fundamentally be carried out in each case by the torque controller and the test object controller. This means that the torque controller and the test object controller do not necessarily have to be pure "regulators" in the control engineering sense, but can also be "controllers" in the control engineering sense.

Thus, a target torque is specified for the torque controller by the test bench automation unit according to the test run in order to adjust the actual torque, i.e., to regulate or control it. This can be done directly by specifying a control torque or by specifying a control variable that is equivalent to the torque or a control variable from which the torque can be derived. Currents, voltages, valve positions, etc., for example, may be mentioned as possible further control variables.

A test object controller is provided for the test object, which test object controller specifies a test object control variable for the test object. The test object controller can "regulate" the actual test object variable (test object torque, test object rotational speed) or "control" the actual test object variable by specifying the target test object variable. In this case, a test object target value can be provided; if the test object is designed to be passive (for example, purely mechanical), it can also be sufficient if only a test object control variable and no test object target value is specified for the test object. For example, a gas pedal position can serve as a test object control variable, in which case reference is made to T/α regulation or T/α control (T for the torque of the load machine and α for the gas pedal position). If, instead of the gas pedal position, a rotational speed is specified for the test object as a test object control variable, this is referred to as T/N regulation or T/N control, wherein T stands for the torque of the load machine and N for the test object rotational speed of the test object. This list is only to be seen as an example; the test object controller can specify any control variable, which is referred to as T/* regulation or T/* control, wherein the asterisk is used as a placeholder for any desired control variable of the test object.

During the operation of T/* regulation or T/* control, usually only the actual torque of the load machine can be set, which means there is little flexibility and it is not possible to react to changed, in particular increased, actual rotational speeds. If the actual rotational speeds are increased, there is a risk that components of the test bench, in particular the test object, could be damaged. Therefore, according to the invention, the actual rotational speed is determined by means of a torque determination unit. Furthermore, at least one attribute of the actual rotational speed is compared with a threshold value and a deviation of the attribute from the threshold value is determined. Based on the current deviation, a torque correction value is determined and superimposed on the target torque. This allows the actual rotational speed of the test object to be influenced via the target torque.

Advantageously, the value of the actual rotational speed is used as a first attribute of the actual rotational speed, and an upper and/or lower rotational speed threshold is provided as a threshold value. A first correction unit can comprise a rotational speed correction controller, preferably a PI controller, and a first superposition unit, wherein the rotational speed correction controller receives a rotational speed deviation of the actual rotational speed from a rotational speed threshold from a first comparison unit and, based on the rotational speed deviation, determines a torque correction value and superimposes it on the control torque via the first superposition unit.

This allows the value of the actual rotational speed to be monitored as an attribute. It can thus be ensured that an upper/lower rotational speed threshold is not exceeded/undershot by the additive torque correction value being superimposed on the target torque.

The rotational speed correction controller can be activated, preferably when a first rotational speed threshold is exceeded, and/or deactivated, preferably when the rotational speed falls below a second rotational speed threshold. This activation and/or deactivation can be carried out by a user and/or the test bench automation unit.

An actual rotational speed gradient of the actual rotational speed is preferably used as a second attribute of the actual rotational speed, wherein an upper and/or lower rotational speed gradient threshold is provided as a threshold value. A second correction unit can comprise a rotational speed gradient correction controller, preferably a PI controller, and a second superposition unit, wherein the rotational speed gradient correction controller receives a first deviation of the actual rotational speed gradient from a rotational speed gradient threshold from a second comparison unit, determines a torque correction value from the first deviation and superimposes the torque correction value on the control torque via the first superposition unit.

If an actual rotational speed gradient is considered as an attribute, a rapid change in rotational speed can be reacted to by adjusting the target torque. It can thus be ensured that the rate of change of the rotational speed does not exceed a threshold value. The actual rotational speed gradient can be determined, for example, by comparing two consecutive absolute values of the rotational speed with one another.

The rotational speed gradient correction controller can be activated, preferably when a first rotational speed gradient threshold is exceeded, and/or deactivated, preferably when a second rotational speed gradient threshold is fallen short of. This activation and/or deactivation can be carried out by a user and/or the test bench automation unit.

An actual torque is advantageously determined and fed back to the torque controller for controlling the actual torque. Accordingly, a torque determination unit can be provided, which is designed to determine the actual torque and is connected to the torque controller in order to feed back the actual torque to control the actual torque.

This results in a regulation of the actual torque in the control engineering sense. If the actual torque were fed back to the torque controller to control the actual torque, as is the case with a control system that is customary according to the prior art, and if a target torque that could not be influenced were also specified for the torque controller, then only an attribute of the actual torque to be controlled could be reacted to. However, a case can arise in which high actual rotational speeds occur on the load machine, which, however, do not necessarily have to be accompanied by an increased actual torque. In particular, an increased actual rotational speed can occur when a clutch between the internal combustion engine of the load machine is opened. By controlling the actual torque according to the prior art, it would therefore not be possible to react to such a rotational speed change. However, because, according to the invention, the actual rotational speed of the load machine is determined, at least one deviation of the at least one attribute of the actual rotational speed from the at least one threshold value is determined and, based on the at least one deviation, an additive torque correction value is determined and superimposed on the target torque, a changed actual rotational speed can be reacted to. In this way, an attribute of the actual rotational speed can be kept within the intended threshold values via the actual torque.

Advantageously, the test bench automation unit specifies a target value for the test object controller in order to adjust an actual test object variable of the test object by specifying the test object control variable. The test bench automation unit can thus be configured to specify a target value for the test object controller, and the test controller can be designed to adjust an actual test object variable by specifying the test object control variable.

Advantageously, an actual test object variable can be determined and fed back to the test object controller to control the actual test object variable. An actual variable determination unit can thus be provided in order to determine the actual test object variable of the test object, wherein the actual variable determination unit is connected to the test object controller to feed the actual test object variable back in order to control the actual test object variable. The test object controller is thus designed as a "controller" in the control engineering sense for the actual test object variable.

At least one threshold value is advantageously specified in a fixed manner. A fixed threshold for an attribute of the actual rotational speed can be implemented by specifying at least one fixed threshold value. If a lower threshold value is provided, falling below this lower threshold value can be monitored. If an upper threshold value is provided, exceeding this upper threshold value can be monitored.

Advantageously, at least one threshold value can be changed, preferably as a function of a known system variable. The time profile of the test run, for example, can be used as a known system variable. For example, a lower rotational speed threshold value can be kept at zero before activating the test object. After the test object has been activated, the lower rotational speed threshold value can be increased to prevent the test object from stopping during the test run.

If an engine as a test object is calibrated on an engine test bench as a test bench, a target torque is specified for the load machine and a gas pedal position (which in turn influences the engine torque) is specified for the engine. As part of the calibration, the test bench automation unit varies an injection timing, for example. Because the injection timing changes not only the combustion quality but also the engine torque of the engine, the operating point is not completely stable, which means that the engine speed can also change. In the case of extreme values, the engine can run away or stall, which can be prevented by monitoring the actual rotational speed and limiting the actual rotational speed by intervening in the injection timing. It is therefore not necessary for the engine to be thermally stabilized again after the operating point has been shifted because the rotational speed threshold values can be dynamically tracked in order to always keep the engine close to the intended operating point.

If, for example, dynamic operation of a drive-train test bench with a speed-controlled test object (engine, drive machine, etc.) and a torque-controlled load machine is provided, it may happen that the test object torque is unexpectedly not maintained for a short time, for example because a clutch has been opened. Depending on the intended rotational speed threshold value, the load machine would now react to an increased actual rotational speed. However, if provision is made for the fact that there will be no reaction in this specific case, the rotational speed threshold can be temporarily shifted.

BRIEF DESCRIPTION OF THE DRAWINGS

In the following, the present invention shall be described in greater detail with reference to FIG. 1 to 3, which show exemplary, schematic and non-limiting advantageous embodiments of the invention. In the drawings.

DETAILED DESCRIPTION

Figure 1:
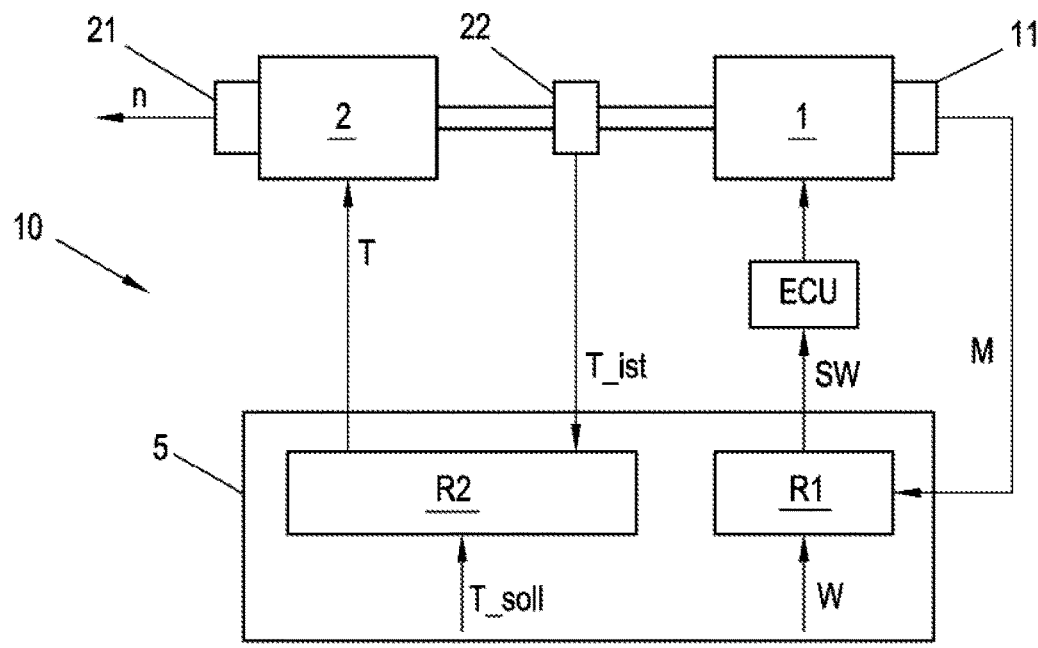
FIG. 1 shows a test bench having a torque controller for the load machine.

A typical test bench 10 for a test object 1 is shown in FIG. 1. For example, engine test benches, (differential) transmission test benches, power packs (engine and transmission), complete drive trains (up to the half shaft), chassis dynamometers, drive train elements (clutch, converter, center differential, differential, etc.) are conceivable as test benches 10.

An internal combustion engine, for example, can be physically set up as the test object 1 as part of a vehicle on the test bench 10. However, a drive train, a drive train component, an entire vehicle or another component to be tested can also serve as the test object 1. An input and/or output of the test object 1 is connected to one or more load machines 2, for example via a test bench shaft. The connection between test object 1 and the load machine can also be made via adapter gears.

A test object controller R1 and a torque controller R2 are provided on the test bench 10. Test object controller R1 and/or torque controller R2 can be designed as an integral part of the test bench automation unit 5, as a stand-alone unit, as part of a converter of a test object controller or load machine controller, etc. The function of the test object controller R1 and/or torque controller E2 can be based on field-oriented control, in particular when a synchronous machine is used as test object 1 and/or load machine 2. Field-oriented control can run on a real-time system and provide switching pulses to transistors. The test object controller R1 and/or the torque controller R2 can also be integrated in such a real-time system. The correction unit B, B1, B2 according to the invention can also be integrated in such a real-time system.

A single load machine 4 or a combination of a plurality of load machines 4 can be controlled by a torque controller R2. The test object 1 can thus be connected to a plurality of load machines 4, for example via test bench summation gearbox.

To carry out the test run, a test bench automation unit 5 determines the corresponding time profile of a target torque T_soll for the load machine 2 and provides the target torque T_soll to the torque controller R2. In order to generate the profile of the target torque T_soll, simulation hardware and/or simulation software, with which the test drive of a vehicle is simulated, can be provided on the test bench automation unit 5. For this purpose, a simulation model, which includes, for example, a driver model, a vehicle model and an environment model, can be implemented in the test bench automation unit 5. Further models, such as a tire model, a road model, etc., can also be implemented.

During the test run, an actual torque T_ist occurs on the load machine 2. In the embodiment shown, the actual torque T_ist is determined by a torque determination unit 22 and fed back to the torque controller R2. A torque sensor on the test bench shaft, for example, or an observer to estimate the actual torque T_ist based on other measured variables can serve as the torque determination unit 22. The actual torque T_ist can of course also be derived from another (measured) variable. The torque controller R2 also determines a control torque T here and transmits said control torque to the load machine 2, on which, as mentioned, the actual torque T_ist is adjusted.

The test object 1 is also operated on the test bench 10 according to the specifications of a test run, wherein the test object controller R1 specifies a test object control variable SW for the test object 1. This can be done, for example, in order to obtain information about certain measured variables. Pollutant emissions, (fuel) consumption, acoustic behavior of the test object 1, etc. can be viewed as measured variables. Depending on the measured variable, a corresponding measuring unit, such as an emission measuring unit, which is supplied with exhaust gas from the test object, can be provided on the test bench 1. An emission measuring unit measures the emission of at least one pollutant, such as $CO_2$, CO, $NO_x$, and/or the total mass of hydrocarbons (THC) and/or a particle count (such as soot particles). A consumption measuring unit, which measures the fuel consumption of the test object, can also be provided as the measuring unit.

In the embodiment shown, the test bench automation unit 5 is designed to specify a target test object variable W for the test object controller R1 according to the test run. Furthermore, in the embodiment shown, the test object controller R1 is designed to set an actual test object variable M of the test object 1 by specifying the test object control variable SW, and an actual variable determination unit 11 is provided in order to determine the actual test object variable M of the test object 1 and feed it back to the test object controller R1 in order to control the actual test object variable M. In this case, the test object controller R1 is configured to set the actual test object variable M of the test object 1 to the target test object variable W in that a test object control variable SW is specified for the test object 1. An actual engine torque, an actual engine speed, etc. can be used as the actual test object variable M, whereas a target engine torque or a target engine speed can be used as the target test object variable W. A gas pedal position a, for example, can be determined as the test object control variable SW, which gas pedal position is transferred to the engine control unit ECU for controlling the test object 1.

The variables actual torque T_ist, target torque T_soll, control torque T, actual test object variable M, target test object variable W, test object control variable SW, actual rotational speed n, etc. can also be understood as continuous-time or discrete-time profiles during the test run.

Figure 2:
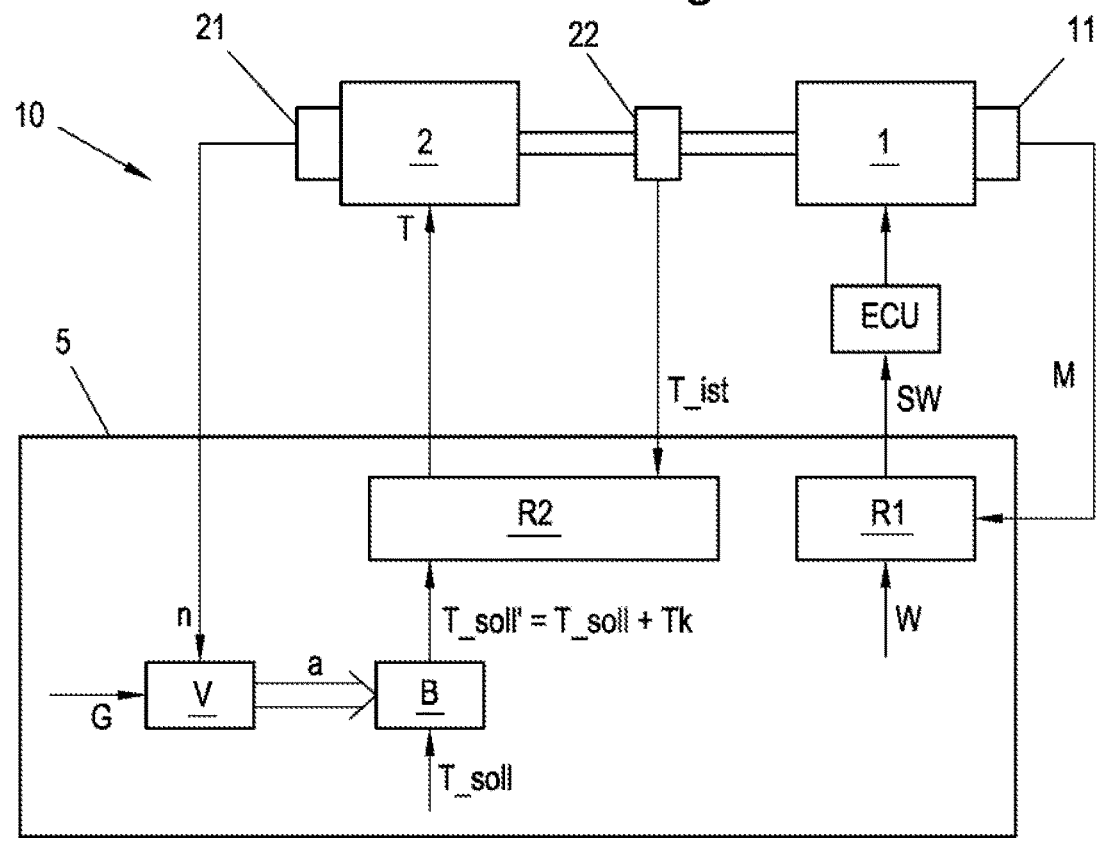
FIG. 2 shows a comparison unit and correction unit.

In FIG. 2, a rotational speed determination unit 21 is provided for detecting the actual rotational speed n. The actual rotational speed n is fed to a comparison unit V, which determines at least one deviation a of at least one attribute of the actual rotational speed n from at least one threshold value G and forwards it to a correction unit B. The correction unit B is designed to determine an additive torque correction value Tk based on the at least one deviation a and to superimpose it on the target torque T_soll, resulting in a modified target torque T_soll'. The torque controller R2 now controls the actual torque T_ist to the modified target torque T_soll', resulting in a modified actual rotational speed n'. The modified target torque T_soll' therefore affects the actual rotational speed n via a modified actual torque T_ist', as a result of which a modified actual rotational speed n' is set. It can thus be ensured that the attribute of the (now modified) actual rotational speed n does not exceed the specified threshold value G.

The correction unit B is connected ahead of the torque controller R2, which prevents the torque controller R2 from correcting the torque correction value Tk again, i.e., setting the now modified actual torque T_ist' back to the unmodified actual torque T_ist. Because the target torque T_soll is corrected ahead of the torque controller R2 by addition to the corrected target torque T_soll', the torque controller R2 does not "notice" this intervention in the target torque T_soll at all.

The additive torque correction value Tk can, of course, assume positive and negative values depending on the deviation a, which means that superimposeing on the target torque T_soll can lead to an increased or reduced modified target torque T_soll.

If, as shown, the actual torque T_ist of the test object is controlled according to a target torque T_soll using the torque controller R2, it is not only possible to react to a change in the actual torque T_ist, but also to monitor an attribute of the actual rotational speed n. By superimposeing the torque correction value Tk, it can also be ensured that the attribute of the actual rotational speed n does not exceed or fall below its threshold value G.

If the actual rotational speed n itself is used as the first attribute of the actual rotational speed n, then the actual rotational speed n can be compared with an upper rotational speed threshold $n_o$ or a lower rotational speed threshold $n_u$ as the threshold value G. If the first deviation a1 exceeds (or falls below) between the actual rotational speed n and the upper or lower rotational speed threshold $n_o$ or $n_u$, a negative or positive additive torque correction value Tk is determined, which is superimposed on the target torque T_soll is and leads to a reduced or increased modified target torque T_soll.

The upper rotational speed threshold $n_o$ or lower rotational speed threshold $n_u$ can be specified as a fixed value or adjusted during the course of the test run. It is also possible to adapt the upper rotational speed threshold $n_o$ or the lower rotational speed threshold $n_u$ as a function of other system variables, such as system variables of test object 1. If an upper rotational speed threshold $n_o$ and a lower rotational speed threshold $n_u$ are specified as threshold values G for the actual rotational speed n, the actual rotational speed n of the load machine 2 can be controlled, for example, in such a way that it remains within a predetermined rotational speed range between the upper rotational speed threshold $n_o$ and the lower rotational speed threshold $n_u$.

If an actual rotational speed gradient of the rotational speed dn is used as the second attribute of the actual rotational speed n, the actual rotational speed gradient dn can be compared with an upper or lower rotational speed gradient threshold $dn_o$ or $d_u$, as the threshold value G in order to determine a second deviation a2. If the second deviation a2 exceeds (or falls below) the upper or lower rotational speed gradient threshold $dn_o$, a negative or positive additive torque correction value Tk is determined, which is superimposed on the target torque T_soll and results in a reduced or increased modified target torque T_soll.

The selection of the lower rotational speed gradient threshold $dn_u$, but in particular the upper rotational speed gradient limit $dn_o$ can serve to protect the test object 1. If exceeding a specific actual rotational speed gradient dn is estimated to be harmful to the test object, the upper rotational speed gradient threshold $dn_o$ can be selected in such a way that this specific actual rotational speed gradient dn is prevented from being reached.

If an upper rotational speed gradient threshold $dn_o$ and a lower rotational speed gradient threshold $d_u$, are specified as threshold values G for the actual rotational speed gradient dn, the actual rotational speed n of the load machine 2 can be controlled, for example, in such a way that the rotational speed gradient dn remains within a specified rotational speed gradient range between the upper rotational speed gradient threshold $dn_o$ and the lower rotational speed gradient threshold $dn_u$.

Basically, it can also be provided that the at least one additive torque correction value Tk is only superimposed on the target torque T_soll if the at least one deviation a exceeds a maximum deviation and/or falls below a minimum deviation.

Figure 3:
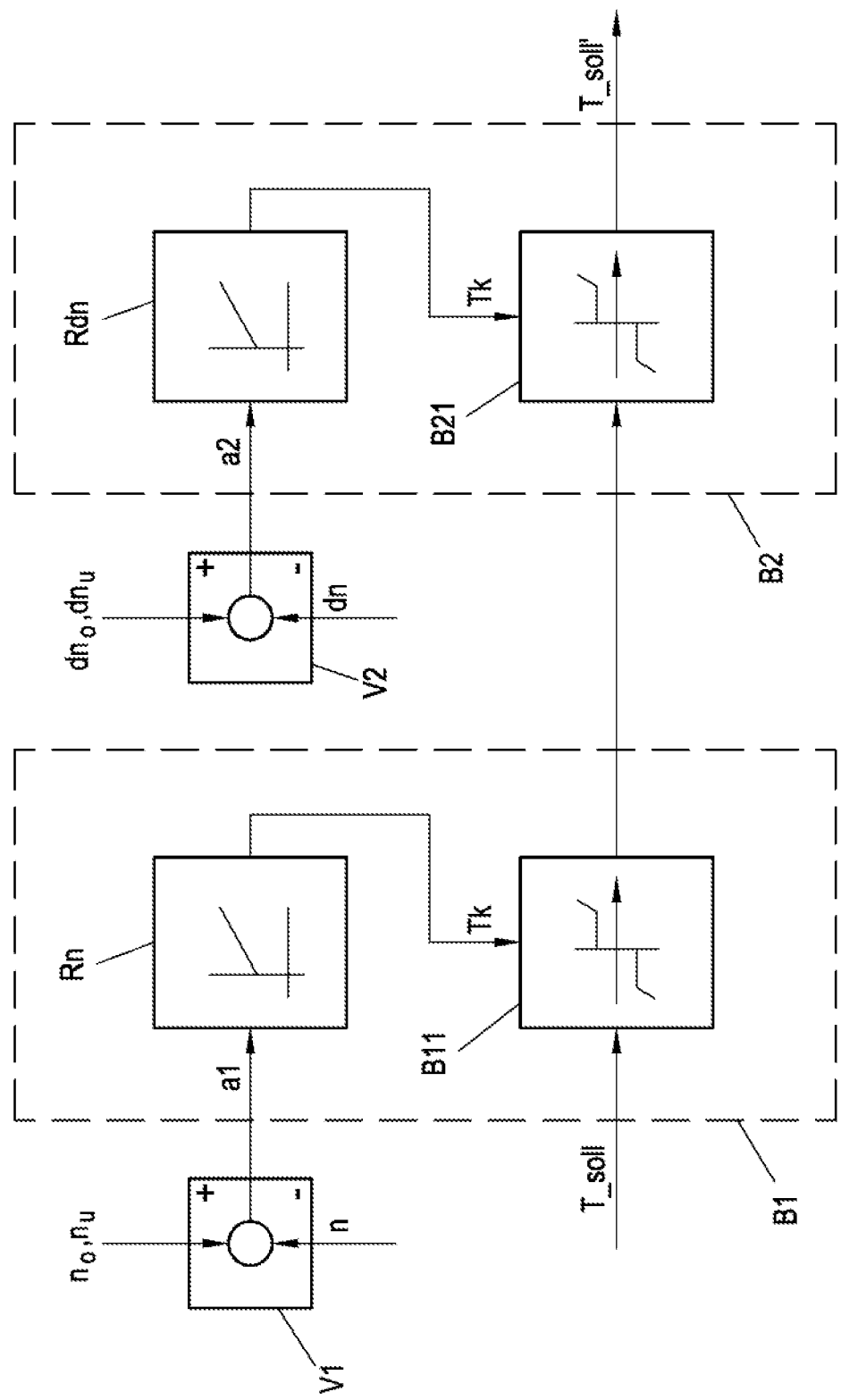
FIG. 3 shows a special embodiment of a first and second correction unit.

FIG. 3 shows a special embodiment of the present invention, wherein a first correction unit B1 comprises a rotational speed correction controller Rn, preferably an upper and a lower PI controller (shown here only as a PI controller), and a first superposition unit B11. A first comparison unit V1 determines a first deviation a1 of the actual rotational speed n from a rotational speed threshold $n_o$, $n_u$ as at least one threshold value G and transfers said first deviation a1 to the rotational speed correction controller Rdn. The rotational speed correction controller Rdn determines a torque correction value Tk based on the first deviation a1 and transmits it to the first superposition unit B11, which superimposes the torque correction value Tk on the target torque T.

The first superposition unit B11 acts additively on the target torque T_soll. This means that the torque correction value Tk is superimposed on the target torque T_soll by the superposition unit B11, i.e., added or subtracted depending on the sign, which leads to a modified target torque T_soll'.

The control range, i.e., working range, of the upper and/or lower PI controller is preferably dependent on the first deviation a1 and the target torque T_soll, whereby a suitable torque correction value Tk is determined. The control range of the upper PI controller can be selected in such a way that it only intervenes when an upper threshold value G (upper rotational speed threshold $n_o$) is exceeded. The control range of the lower PI controller can be designed in such a way that it only intervenes when a lower threshold value G (lower rotational speed threshold $n_u$) is fallen short of. Zero is preferably provided as the lower rotational speed threshold $n_u$. The controller parameters of the upper and lower PI controller can preferably be defined by a common parameter set.

A second correction unit B2 is also provided, which includes a rotational speed gradient correction controller Rdn, preferably a PI controller, and a second superposition unit B12. An actual rotational speed gradient dn is determined based on the actual rotational speed n, which can be done by the second comparison unit V2 or an upstream determination unit. In FIG. 2, the actual rotational speed gradient dn is specified for the second comparison unit V2 and is thus determined based on the actual rotational speed n by a determination unit (not shown). The second comparison unit V2 determines the second deviation a2 between the actual rotational speed gradient dn and an upper and/or lower rotational speed gradient threshold $dn_o$, $dn_u$, which is present as threshold value G. Said second deviation a2 is fed to the rotational speed gradient correction controller Rdn, which processes it and, based thereon, transmits a torque correction value Tk to a second superposition unit B21. The second superposition unit B21 superimposes the torque correction value Tk on the target torque T_soll, which results in a modified target torque T_soll'. The rotational speed gradient correction controller Rdn can be implemented as described above with regard to the rotational speed correction controller Rn. An upper and lower PI controller can thus also be provided, the control ranges of which can also be selected in such a way that the respective PI controller only intervenes if the rotational speed gradient dn exceeds an upper rotational speed gradient threshold $dn_o$ and/or falls below a lower rotational speed gradient threshold $dn_u$. The actual rotational speed gradient dn can be provided with a sign, wherein the lower rotational speed gradient threshold $dn_u$ has a negative sign.

A first superposition unit B11 can thus modify the target torque T_soll by superimposeing a torque correction value Tk on the modified target torque T_soll', and the second superposition unit B21 can further modify the already modified target torque T_soll' by superimposeing a (further) torque correction value Tk or vice versa if the second superposition unit B21 is arranged ahead of the first superposition unit B11.

The comparison units V1, V2 and/or rotational speed correction controller Rn and/or rotational speed gradient correction controller Rdn, etc. can be designed as an integral part of the test bench automation unit 5, as an independent unit, as a function of the test object controller R1 and/or torque controller R2, etc.

If the first superposition unit B11 does not modify the target torque T_soll (for example, because the rotational speed correction controller Rn does not initiate this due to the first deviation a1 being too small), the second superposition unit can still determine an additive torque correction value Tk and superimpose it on the target torque T_soll. Similarly, the case can arise that the second superposition unit B11 does not modify the control torque T (for example, because the rotational speed gradient correction controller Rn does not initiate this due to the second deviation a2), the first superposition unit B11 can nevertheless determine an additive torque correction value Tk and superimpose it on the target torque T_soll.

Although a rotational speed correction controller Rn and a rotational speed gradient correction controller Rdn are provided in the embodiment shown, a modification of the target torque T_toll using only one rotational speed correction controller Rn or only one rotational speed gradient correction controller Rdn is of course conceivable.

The rotational speed correction controller Rn can be designed to be activated and deactivated. For example, the rotational speed correction controller Rn can be activated as a function of the actual rotational speed n exceeding a first rotational speed threshold and deactivated if the actual rotational speed falls below a second rotational speed threshold. Of course, the first and second rotational speed thresholds may coincide. If they do not coincide, a hysteresis is formed.

The rotational speed gradient correction controller Rdn can be configured so that it can be activated and deactivated. For example, the rotational speed gradient correction controller Rn can be activated as a function of the actual rotational speed gradient dn exceeding a first rotational speed gradient limit and deactivated when the actual rotational speed gradient falls below a second rotational speed gradient threshold. Of course, the first and second rotational speed gradient thresholds may coincide. If they do not coincide, a hysteresis is formed.

The invention claimed is:

1. A method for carrying out a test run on a test bench including the following steps:
    connecting a test object to a load machine on the test bench,
    specifying a target torque (T_soll) for a torque controller by a test bench automation unit according to the test run,
    adjusting an actual torque (T_ist) of the load machine by the torque controller (R2), and
    specifying a test object control variable (SW) for the test object by a test object controller (R1),
    determining an actual rotational speed (n) of the load machine,
    determining at least one deviation (a, a1, a2) of at least one attribute of the actual rotational speed (n) from at least one threshold value (G), and
    based on the at least one deviation (a, a1, a2), determining at least one additive torque correction value (Tk) and superimposing the at least one additive torque correction value (Tk) on the target torque (T_soll).

2. The method according to claim 1, characterized in that the value of the actual rotational speed (n) is used as a first attribute of the actual rotational speed (n), and in that an upper and/or lower rotational speed threshold (no, nu) is provided as a threshold value (G).

3. The method according to claim 1, characterized in that an actual rotational speed gradient (dn) is used as a second attribute of the actual rotational speed (n), and in that an upper and/or lower rotational speed gradient threshold (dno, dnu) is provided as a threshold value (G).

4. The method according to claim 1, characterized in that an actual torque (T_ist) is determined and fed back to the torque controller for controlling the actual torque (T_ist).

5. The method according to claim 1, characterized in that a target value (W) is specified for the test object controller by the test bench automation unit in order to set an actual test object variable (M) of the test object by specifying the test object control variable (SW).

6. The method according to claim 5, characterized in that the actual test object variable (M) of the test object is determined and fed back to the test object controller for controlling the actual test object variable (M).

7. The method according to claim 1, characterized in that at least one threshold value (G) is fixed.

8. The method according to claim 1, characterized in that at least one threshold value can be changed.

9. The method according to claim 8, wherein the at least one threshold value is changed based upon a known system variable.

10. A test bench for carrying out a test run, the test bench comprising:
    a load machine configured to be coupled to a test object;
    a torque controller configured to adjust an actual torque (T_ist) of the load machine;
    a test bench automation unit configured to specify a target torque (T_soll) for the torque controller according to the test run;
    a test object controller configured to specify a test object control variable (SW) for the test object;
    a rotational speed determination unit configured for determining an actual rotational speed (n) of the load machine;
    at least one comparison unit configured to determine at least one deviation (a, a1, a2) of at least one attribute of the actual rotational speed (n) from at least one threshold value (G);
    at least one correction unit configured to determine, based on the at least one deviation (a, a1, a2), at least one additive torque correction value (Tk) and superimpose it on the target torque (T_soll).

11. The test bench according to claim 10, further including a first correction unit with a rotational speed correction controller, and a first superposition unit, wherein the rotational speed correction controller is configured to
    receive a first deviation (a1) of the actual rotational speed (n) from a rotational speed threshold (no, nu) from a first comparison unit (V1),
    based on the first deviation (a1), determine a torque correction value (Tk), and
    superimpose the torque correction value on a control torque (T) via the first superposition unit.

12. The test bench according to claim 11, characterized in that the rotational speed correction controller is configured to be activated, and/or deactivated.

13. The test bench of claim 12, wherein the rotational speed correction controller can be activated when a first rotational speed threshold is exceeded, and/or deactivated when the speed falls below a second rotational speed threshold.

14. The test bench of claim 11, wherein the rotational speed controller is a PI controller.

15. The test bench according to claim 9, further including a second correction unit with a rotational speed gradient correction controller, and a second superposition unit, wherein the rotational speed gradient correction controller is configured to receive a second deviation (a2) of an actual rotational speed gradient (dn) from a rotational speed gradient threshold (dno, dnu) from a second comparison unit (V2), and determine a torque correction value (Tk) from the second deviation (a2), and superimpose the torque correction value (Tk) on a control torque (T) via the second superposition unit.

16. The test bench according to claim 15, characterized in that the rotational speed gradient correction controller can be activated, and/or deactivated.

17. The test bench of claim 16, wherein the rotational speed gradient correction controller can be activated when a first rotational speed gradient threshold is exceeded, and/or deactivated when the speed falls below a second rotational speed gradient threshold.

18. The test bench according to claim 10, further including a torque determination unit configured to determine the actual torque (T_ist) and communicatively connected to the torque controller in order to feed the actual torque (T_ist) back to control the actual torque (T_ist).

19. The test bench according to claim 10, characterized in that the test bench automation unit is configured to specify a target value (W) for the test object controller, and in that the test object controller is configured to specify an actual test object variable (M) of the test object by specifying the test object control variable (SW).

20. The test bench according to claim 19, further including an actual variable determination unit configured to determine an actual test object variable (M) of the test object, wherein the actual variable determination unit is communicatively connected to the test object controller and the actual variable determination unit is further configured and arranged to feed the actual test object variable (M) back to the test object controller in order to control the actual test object variable (M).

* * * * *